United States Patent [19]
Barrett et al.

[11] Patent Number: 5,189,718
[45] Date of Patent: Feb. 23, 1993

[54] COMPOSITE CABLE CONTAINING LIGHT WAVEGUIDES AND ELECTRICAL CONDUCTORS

[75] Inventors: Michael J. Barrett; Andrew S. Dodd, both of Hickory, N.C.

[73] Assignee: Siecor Corporation, Hickory, N.C.

[21] Appl. No.: 862,475

[22] Filed: Apr. 2, 1991

[51] Int. Cl.$^5$ .............................................. G02B 6/44
[52] U.S. Cl. ................................... 385/101; 385/100; 774/117 R
[58] Field of Search ................ 385/101, 100, 102; 174/117 R, 117 F, 17 R, 115

[56] References Cited

U.S. PATENT DOCUMENTS

| | | | |
|---|---|---|---|
| 4,423,306 | 12/1983 | Fox | 174/115 X |
| 4,761,053 | 8/1988 | Cogelia et al. | 350/96.23 |
| 4,763,983 | 8/1988 | Keith | 350/96.23 |
| 4,852,965 | 8/1989 | Mullin et al. | 385/101 |
| 4,856,867 | 8/1989 | Gaylin | 350/96.23 |
| 4,952,020 | 8/1990 | Huber | 350/96.23 |

FOREIGN PATENT DOCUMENTS 0321278  6/1989  European Pat. Off. ............ 385/101

Primary Examiner—John D. Lee
Assistant Examiner—Phan T. Heartney
Attorney, Agent, or Firm—J. David Abernethy

[57] ABSTRACT

Disclosed is a cable in which one tube holding light waveguides is connected by a plastic web to another tube holding metallic current carrying conductors. When buried in the earth, the cable may be located by means of a magnetic field produced by the current carrying conductors, but the cable retains the advantage of the tube carrying the light waveguides being dielectric.

6 Claims, 1 Drawing Sheet

COMPOSITE CABLE CONTAINING LIGHT WAVEGUIDES AND ELECTRICAL CONDUCTORS

BACKGROUND OF THE INVENTION

The field of the invention is cables having both light waveguides and current carrying conductors.

It is well known that it is sometimes desirable to provide cables holding both light waveguides and current carrying conductors. The current carrying conductors may supply power to repeaters to boost the effective light waveguide transmission distance for the cable, or the current carrying conductors may also carry communication messages themselves, providing two different communications media.

More recently, it has been proposed that buried cables holding current carrying conductors may be located by detection of magnetic fields which are generated by electric currents in the current carrying conductors.

It is also known that, particularly in certain areas, light waveguides may be damaged due to melting and crushing forces caused by lightning strikes on the cable. To reduce the possibility of lightning induced damage, dielectric cables may be provided.

Apparently, the prior art does not provide a cable which combines the advantages of a cable having light waveguides in a dielectric environment and the advantage of current carrying conductors.

SUMMARY OF THE INVENTION

This apparent gap in the prior art is filled by the present invention, which calls for a web extending between a first tube and a second tube, the first tube containing a plurality of current carrying electrical conductors and the second tube containing a plurality of light waveguides. The web has a thickness narrower than half the outer diameter of either the first tube or the second tube. If desirable in a particular application, a tubular metallic shield may be disposed between the electrical conductors and the first tube, and additional strength members or no strength member may be placed in the second tube containing the plurality of light waveguides. The tube containing the light waveguides is preferably dielectric, but it may also contain metallic elements such as corrugated tubing if such is desirable.

BRIEF DESCRIPTION OF THE DRAWINGS

The detailed description is made with reference to the single drawing FIG. 1, which is a cut-back perspective view of the cable according to the invention.

DETAILED DESCRIPTION OF THE PREFERRED EMBODIMENT

Figure 1:
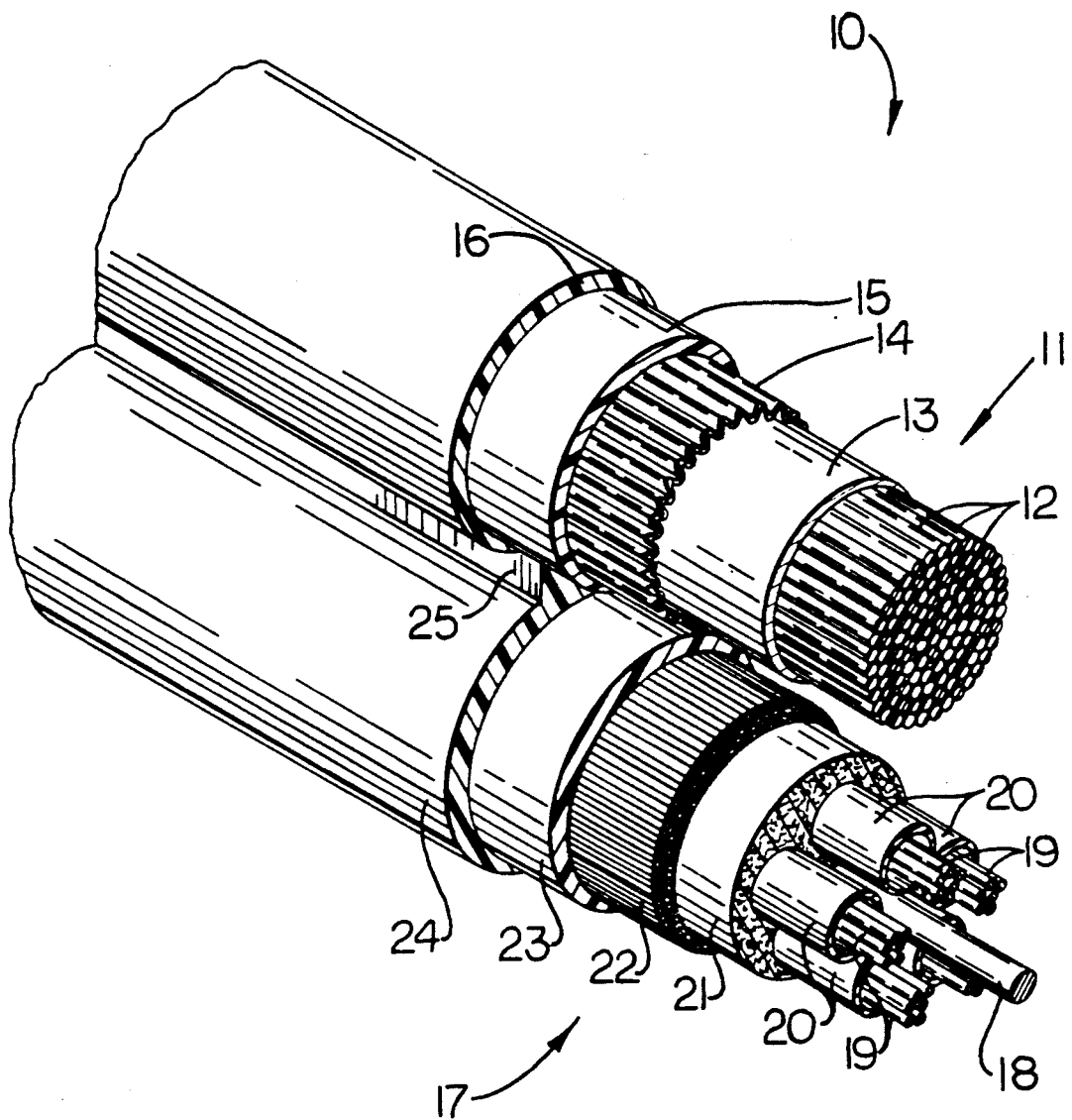

Composite cable 10 is composed of a copper side 11 and a waveguide side 17. First tube 16 contains a plurality of copper current carrying electrical conductors 12; second tube 24 contains a plurality of light waveguides 19; and web 25 extends between first tube 16 and second tube 24. The thickness of web 25 is less than one-half the outer diameter of either first tube 16 or second tube 24.

Electrical conductors 12 may, for example, be 25 pairs of 22 gauge copper wire. Conductors 12 are surrounded by dielectric tape 13 and corrugated, copolymer coated aluminum shield 14. The corrugations of shield 14 may be transverse to instead of parallel to the cable axis. Surrounding shield 14 are tubes 15 and 16, each composed of medium density polyethylene.

Second tube 24 contains a central anti-buckling member 18 which may be any of a variety of materials such as glass reinforced plastic. Surrounding strength member 18 are a plurality of buffer tubes 20 each containing a plurality of light waveguides 19. It will also be appreciated that buffer tubes 20 may contain different light waveguide cable constructions such as light waveguide ribbons or loose waveguides or ribbons housed in slotted core constructions. Surrounding buffer tubes 20 is filling compound 21, aramid yarn 22, and tubes 23 and 24, both of which are composed of medium density polyethylene. Second tube 24 and its contents are dielectric, having only a slight electrical conductivity.

The preferred embodiment has a certain flexibility in processing, in that tube 15 and its contents and tube 23 and its contents may be manufactured separately, and then passed through a single extrusion die to be covered jointly by first tube 16, second tube 24, and web 25. As an alternative, cable 10 could be formed in a single processing line.

Cable 10 may be manufactured in various sizes according to customer specifications. A first construction might have 25 copper pairs and 36 light waveguides, with the first tube 16 having an outer diameter of 21.9 mm and second tube 24 having an outer diameter of 14.4 mm. A second construction might have 75 copper pairs with first tube 16 having an outer diameter of 33.1 mm, and 72 light waveguides, with second tube 24 having an outer diameter of 15.3 mm. Second tube 24 could contain any of a wide variety of light waveguide cable designs such as slotted core, ribbon, or loose tube construction, and first tube 16 could contain any of a variety of previously known cable designs for current carrying electrical conductors. The spirit of the invention would include any such variations lying within the scope of the claims.

What is claimed is:

1. A cable containing light waveguides and electrical conductors, comprising:
   (a) a first tube containing a plurality of current carrying electrical conductors;
   (b) a second tube containing at least one strength member and a plurality of light waveguides; and,
   (c) a web extending between the first and second tubes, said web having a thickness narrower than half the outer diameter of the first tube or the second tube.

2. A cable as recited in claim 1, wherein the second tube and its contents are dielectric.

3. A cable containing light waveguides and electrical conductors, comprising:
   (a) a first tube containing a plurality of current carrying electrical conductors and a tubular metallic shield disposed between the electrical conductors and the first tube;
   (b) a second tube containing a plurality of light waveguides; and,
   (c) a web extending between the first and second tubes, said web having a thickness narrower than half the outer diameter of the first tube or the second tube.

4. A cable as recited in claim 3, wherein the second tube and its contents are dielectric.

5. A cable containing light waveguides and electrical conductors, comprising:
   (a) a first tube containing a plurality of current carrying electrical conductors and a tubular metallic shield disposed between the electrical conductors and the first tube;
(b) a second tube containing at least one strength member and a plurality of light waveguides; and,
(c) a web extending between the first and second tubes, said web having a thickness narrower than half the outer diameter of the first tube or the second tube.

6. A cable as recited in claim 5, wherein the second tube and its contents are dielectric.

* * * * *